US009036613B2

(12) United States Patent
Vleugels et al.

(10) Patent No.: US 9,036,613 B2
(45) Date of Patent: May 19, 2015

(54) METHOD AND APPARATUS FOR OPERATING A WIRELESS PAN NETWORK USING AN OVERLAY PROTOCOL THAT ENHANCES CO-EXISTENCE WITH A WIRELESS LAN NETWORK

(75) Inventors: Katelijn Vleugels, San Carlos, CA (US); Roel Peeters, San Carlos, CA (US)

(73) Assignee: Atmel Corporation, San Jose, CA (US)

(*) Notice: Subject to any disclaimer, the term of this patent is extended or adjusted under 35 U.S.C. 154(b) by 708 days.

(21) Appl. No.: 11/376,753

(22) Filed: Mar. 14, 2006

(65) Prior Publication Data
US 2006/0227753 A1      Oct. 12, 2006

Related U.S. Application Data

(60) Provisional application No. 60/661,746, filed on Mar. 14, 2005.

(51) Int. Cl.
*H04W 4/00* (2009.01)
*H04W 92/02* (2009.01)
(Continued)

(52) U.S. Cl.
CPC .............. *H04W 92/02* (2013.01); *H04W 28/26* (2013.01); *H04W 72/12* (2013.01); *H04W 84/10* (2013.01);
(Continued)

(58) Field of Classification Search
CPC ..................................................... H04W 84/12
USPC .................................. 370/338, 334; 455/41.2
See application file for complete search history.

(56) References Cited

U.S. PATENT DOCUMENTS 6,272,140 B1   8/2001  LaRowe, Jr. et al.
6,300,864 B1  10/2001  Willey
(Continued)

FOREIGN PATENT DOCUMENTS

EP       1207654 A2       5/2002
WO    WO 97/48198 A2    12/1997
(Continued)

OTHER PUBLICATIONS

Heile et al. A presentation to the Mobile IP work Group, IETF45, Internet Engineering Task Force, IEEE 802.15 Working Group for Wireless Personal Area Networks (Jul. 16, 1999).
(Continued)

*Primary Examiner* — George Eng
*Assistant Examiner* — Muthuswamy Manoharan
(74) *Attorney, Agent, or Firm* — Fish & Richardson P.C.

(57) ABSTRACT

A computing device is interfaced with other devices in a wireless personal area network (PAN) to enhance co-existence with a wireless local area network (WLAN), wherein the WLAN is characterized by a plurality of nodes intercommunicating for various network devices and the wireless PAN is characterized by lower power transmissions relative to transmissions over the WLAN. The computing device coordinates activity of the wireless PAN as a coordinator for the wireless PAN, including communicating with the wireless PAN devices using a protocol that is an overlay protocol only partially compliant with the protocol used over the WLAN but that enables co-existence. The WLAN can be an 802.11 wireless LAN. WLAN devices preferably can, upon hearing an overlay protocol frame, understand at least enough of the overlay protocol frame to defer use of a common wireless networking medium. If the PAN coordinator is capable of associating with the WLAN, it can be a dual-network device capable of associating with the WLAN and PAN simultaneously. The dual-network device can use a common network module to handle both WLAN and PAN traffic.

10 Claims, 10 Drawing Sheets

(51) Int. Cl.
  *H04W 28/26* (2009.01)
  *H04B 7/00* (2006.01)
  *H04W 72/12* (2009.01)
  *H04W 84/10* (2009.01)
  *H04W 84/12* (2009.01)
  *H04W 84/20* (2009.01)
  *H04W 84/22* (2009.01)
  *H04W 88/04* (2009.01)
  *H04W 88/06* (2009.01)
  *H04W 88/10* (2009.01)

(52) U.S. Cl.
  CPC .............. *H04W 84/12* (2013.01); *H04W 84/20* (2013.01); *H04W 84/22* (2013.01); *H04W 88/04* (2013.01); *H04W 88/06* (2013.01); *H04W 88/10* (2013.01); *Y02B 60/50* (2013.01)

(56) References Cited

U.S. PATENT DOCUMENTS

| | | | |
|---|---|---|---|
| 6,505,253 | B1 | 1/2003 | Chiu et al. |
| 6,842,460 | B1 | 1/2005 | Olkkonen et al. |
| 7,020,451 | B2 | 3/2006 | Sugar et al. |
| 7,039,358 | B1* | 5/2006 | Shellhammer et al. ...... 455/41.2 |
| 2004/0076136 | A1* | 4/2004 | Beach .......................... 370/338 |
| 2004/0170120 | A1 | 9/2004 | Reunamaki et al. |
| 2005/0025104 | A1* | 2/2005 | Fischer et al. ................ 370/338 |
| 2005/0025174 | A1 | 2/2005 | Fischer et al. |
| 2005/0176371 | A1 | 8/2005 | Palin et al. |
| 2005/0176473 | A1* | 8/2005 | Melpignano .................. 455/574 |
| 2005/0286474 | A1* | 12/2005 | van Zelst et al. ............. 370/334 |
| 2006/0120334 | A1 | 6/2006 | Wang et al. |
| 2006/0146868 | A1 | 7/2006 | Ginzburg |
| 2006/0165035 | A1 | 7/2006 | Chandra et al. |
| 2006/0203841 | A1 | 9/2006 | Fischer |
| 2006/0215601 | A1 | 9/2006 | Vleugels et al. |
| 2008/0144493 | A1 | 6/2008 | Yeh |
| 2008/0291858 | A1 | 11/2008 | Kandala et al. |
| 2009/0086619 | A1* | 4/2009 | Santhoff et al. .............. 370/208 |

FOREIGN PATENT DOCUMENTS

| | | |
|---|---|---|
| WO | WO 03/065654 A1 | 8/2003 |
| WO | WO 2004/021720 | 3/2004 |
| WO | WO 2006/099588 A2 | 9/2006 |

OTHER PUBLICATIONS

Zeino et al. "Functional Approach to a Hybrid Wireless Network for Mobile Stations", IEEE Personal, Indoor and Mobile Radio Communications / ICCC Wireless Computer Networks (PIMRC'94/ WCN), The Hague, The Netherlands, pp. 994-998 (Sep. 1994).
Office Action for U.S. Appl. No. 11/376,737, dated Sep. 3, 2009.
Office Action for U.S. Appl. No. 11/376,737, dated Apr. 1, 2010.
Office Action for U.S. Appl. No. 11/376,737, dated Apr. 15, 2011.
Office Action for U.S. Appl. No. 11/423,785, dated Sep. 2, 2009.
Office Action for U.S. Appl. No. 11/423,785, dated Mar. 22, 2010.
Office Action for U.S. Appl. No. 11/423,785, dated Sep. 29, 2010.
Office Action for U.S. Appl. No. 11/423,813, dated Jul. 21, 2009.
Office Action for U.S. Appl. No. 11/423,813, dated Mar. 17, 2010.
International Search Report and Written Opinion corresponding to the PCT application No. PCT/US06/09786, dated Sep. 25, 2007, 9 pages total.
The State Intellectual Property Office of the People's Republic of China, First Office Action for Application No. 200680013461.6, dated May 12, 2010, 24 pages total.
U.S. Appl. No. 11/376,759, filed Mar. 14, 2006, 81 pgs.
U.S. Appl. No. 11/376,737, filed Mar. 14, 2006, 80 pgs.
U.S. Appl. No. 11/423,785, filed Jun. 13, 2006, 81 pgs.
U.S. Appl. No. 11/423,813, filed Jun. 13, 2006, 78 pgs.
U.S. Appl. No. 13/340,465, filed Dec. 29, 2011, patent application as filed, 80 pages.
Office Action for U.S. Appl. No. 13/340,465 dtd Jul. 20, 2012, 21 pgs.
Final Office Action for U.S. Appl. No. 13/340,465 dtd Mar. 22, 2013, 22 pgs.
Extended European Search Report dated Jul. 18, 2013, 9 pgs.
Restriction Requirement in U.S. Appl. No. 11/376,737, dtd Mar. 19, 2009, 7 pgs.
Office Action for U.S. Appl. No. 11/376,737, dtd Sep. 3, 2009, 20 pgs.
Advisory Action for U.S. Appl. No. 11/376,737, dtd Nov. 9, 2010, 3 pgs.
Office Action for U.S. Appl. No. 11/376,737, dtd Apr. 15, 2011, 20 pgs.
Notice of allowance for U.S. Appl. No. 11/423,785 mailed Mar. 24, 2014, 15 pgs.
Non-final office action for U.S. Appl. No. 13/340,465 mailed Dec. 19, 2013, 23 pgs.

* cited by examiner

PP - PWN Protocol (802.11x, etc.)
SP - SWN Protocol (802.11x, overlay, HS Protocol, etc.)

METHOD AND APPARATUS FOR OPERATING A WIRELESS PAN NETWORK USING AN OVERLAY PROTOCOL THAT ENHANCES CO-EXISTENCE WITH A WIRELESS LAN NETWORK

CROSS-REFERENCES TO RELATED APPLICATIONS

This application claims the benefit of and is a non-provisional of U.S. Patent Application Ser. No. 60/661,746 filed on Mar. 14, 2005, which is incorporated by reference in its entirety for all purposes.

FIELD OF THE INVENTION

The present invention relates generally to wireless communications and more particularly to coordinating different network uses of a common wireless medium.

BACKGROUND OF THE INVENTION

Wireless communication among electronic devices has been increasing as the benefits and conveniences of wireless communication become more preferred. A wireless communication system or wireless network is often described as containing nodes (or more precisely, circuitry associated with the concept of a node) and a wireless medium (WM) over which the nodes' circuitry communicate to convey information. Where some action or activity is described as happening at (or being done at) a node, it should be understood that the electronic device and/or network interface that is at (or simply is) the node is the circuitry that is performing the action or activity. For example, sending data from node A to node B means transmitting a signal from circuitry associated with node A and receiving that signal (or more precisely, the transmitted signal modified by the medium) using circuitry associated with node B.

The information conveyed between nodes can be digital data and digitized analog signals, or other forms of information, but communication system design often assumes that digital data is being conveyed and higher network layers interpret the data appropriately. For purposes herein, it is assumed that data exists at one node, is provided to lower network layers, is conveyed to another node over a WM, is received by another node correctly or incorrectly and then is conveyed to upper network layers at the receiver. In one model, two networked devices run applications that pass data between themselves by having the sending device's application convey data to an application layer of a network stack, which conveys data to lower levels, ultimately to a medium access control (MAC) layer and a physical network (PHY) layer, and the process is inverted at the recipient.

To set up a wireless network, all that is needed is a plurality of electronic "node" devices capable of transmitting and receiving data in a manner understood by the two (or more) nodes involved in a conversation, with the node devices appropriately placed such that they can communicate in the medium that exists between the devices. The medium could be some type of dielectric material, but more commonly, the medium is the air space and objects (walls, chairs, books, glass. etc.) that are between devices or are positioned such that they have an effect on the signals transmitted between devices. Presumably, the node devices are assigned unique identifiers to distinguish transmissions, but this might not always be necessary. Examples of such unique identifiers are MAC addresses and IP addresses.

As the existence of various wireless media and their properties are known and are not the focus of this disclosure, the medium is often just shown in the attached figures as a cloud. Thus, it should be understood that supplier of a set of two or more powered devices that can communicate supplies a wireless network; the wireless medium is presumed.

Wireless communication systems can be categorized based on coverage range, which in some cases is dictated by use. A wireless local area network or "WLAN", has a typical coverage range on the order of 300 feet and is useful for providing communications between computing devices in some (possibly loosely) defined space such as a home, office, building, park, airport, etc. In some modes of operation, one or more of the nodes is coupled to a wired network to allow other nodes to communicate beyond the wireless network range via that wired network. In 802.11 terminology, such nodes are referred to as "access points" and the typical protocol is such that the other nodes (referred to as "stations") associate with an access point and communication is generally between a station and an access point. Some wireless networks operate in an "ad hoc" mode, wherein node devices communicate with each other without an access point being present.

A personal area network or "PAN" is a short-range wireless network, with typical coverage ranges on the order of 30 feet, usable to connect peripherals to devices in close proximity, thereby eliminating cables usually present for such connections. For example, a PAN might be used to connect a headset to a mobile phone or music/audio player, a mouse or keyboard to a laptop, a PDA or laptop to a mobile phone (for syncing, phone number lookup or the like), etc. Yet another example of a wireless PAN application is wireless medical monitoring devices that wirelessly connect monitoring hardware to a pager or similar read-out device. Yet another example is a remote control that connects to a wireless-enabled electronic device.

Some networks might fall in a gray area between a WLAN and a PAN, but in many cases, a network is clearly one or the other. A personal area network (PAN) is generally used for the interconnection of information technology devices within the range of an individual person, typically within a range of 10 meters. For example, a person traveling with a laptop will likely be the sole user of that laptop and will be the same person handling the personal digital assistant (PDA) and portable printer that interconnect to the laptop without having to plug anything in, using some form of wireless technology. Typically, PAN nodes interact wirelessly, but nothing herein would preclude having some wired nodes. By contrast, a wireless LAN tends to be a local area network (LAN) that is connected without wires and serves multiple users.

Equipment connecting to a wireless communication system in general, and to a wireless PAN communication system in particular, is typically used for applications where power usage, weight, cost and user convenience are very important. For example, with laptops, low-cost accessories are preferable, and it is critical that the power usage of such accessories be minimized to minimize the frequency at which batteries need to be replaced or recharged. The latter is a burden and annoyance to the user and can significantly reduce the seamless user experience.

Weight and complexity are additional concerns in many wireless communication systems. Particularly with mobile devices such as laptops, weight is a concern and the user would rather not have to deal with the hassle of carrying around a multiplicity of devices. Mobile devices are devices that can be expected to be in use while moving, while portable devices are devices that are movable from place to place but generally are not moving when in use. The considerations for mobile devices also apply to portable devices, albeit sometimes with less of a concern. For example, with a wireless connection of a peripheral to a laptop, both devices are likely to be used while mobile or moved frequently and carried around. Thus, weight and the number of devices is an important consideration. With portable devices, such as a small desktop computer with a wireless trackball, as long as the total weight is below a user's carrying limit, the weight is not as much a concern. However, battery life is often as much a concern with portable devices as it is with mobile devices.

There are shades of grey between "portable" and "mobile" and it should be understood that the concerns of mobile applications and portable applications can be considered similar, except where indicated. In other words, a mobile device can be a portable device in the examples described herein.

Where a computing and/or communication device connects to a WLAN, it uses wireless circuitry that often times are already built into the computing device. If the circuitry is not built in, a WLAN card (such as a network interface card, or "NIC") might be used. Either way, some antenna circuitry is used and power is required to run that circuitry.

Where a device also connects wirelessly to peripherals or other devices over short links often referred to as forming a "personal area network" or "PAN", circuitry is needed for that connection as well. This circuitry is typically provided with an external interface unit that is plugged into or onto the device. For example, where the device is a laptop, the circuitry might be provided by a Universal Serial Bus (USB) dongle that attaches to a USB port of the laptop. The USB dongle contains the radio circuitry needed to communicate wirelessly over the short wireless links.

In general, a wireless connection between two or more devices requires that each device include wireless network circuitry for conveying signals over the medium and receiving signals over the medium, as well as processing/communication circuitry to receive, process and/or convey data and/or signals to that wireless network circuitry. The processing/communication circuitry could be implemented with actual circuits, software instructions executable by a processor, or some combination thereof. In some variations, the wireless network circuitry and processing/communication circuitry are integrated (such as with some PDAs, wireless mice, etc.) or are separate elements (such as a laptop as the processing/communication circuitry and a network PCMCIA card as the wireless network circuitry).

For ease of understanding this disclosure, where it is important to make the distinction between devices, a device that exists to provide wireless connectivity is referred to as a "network interface", "network interface device", "wireless network interface device" or the like, while the device for which the wireless connectivity is being provided is referred to as a "computing device" or an "electronic device" notwithstanding the fact that some such devices do more than just compute or might not be thought of as devices that do actual computing and further notwithstanding the fact that some network interface devices themselves have electronics and do computing. Some electronic devices compute and communicate via an attached network interface device while other electronic devices might have their network interface devices integrated in a non-detachable form. Where an electronic device is coupled to a wireless network interface to a wireless network, it is said that the device is a node in the network and thus that device is a "node device".

An 802.11x (x=a, b, g, n, etc.) NIC (network interface card) or 802.11x built-in circuitry might be used for networking an electronic device to the outside world, or at least to devices at other nodes of a WLAN 802.11x network, while using an external dongle or a similar interface device with Bluetooth or proprietary wireless circuitry for communication between the computing device and the peripheral or other PAN node.

A device that is equipped with an 802.11x-conformant network interface to the WM is herein referred to as a station or "STA". In 802.11 terminology, set of STAs constitutes a Basic Service Set ("BSS"). A set of STAs that communicate in a peer-to-peer configuration is referred to as an "802.11x ad-hoc" network or an independent BSS (IBSS). A set of STAs controlled by a single coordinator is referred to as an 802.11x infrastructure network. The coordinator of a BSS is herein referred to as the access point or "AP".

A typical access point device is wired to a wired network and is also wired to an external source of electricity, such as being plugged into a wall socket or wired to a building's power grid. For example, a building, an airport or other space people might occupy might have fixed access points mounted throughout the space to provide adequate network coverage for the purpose of providing access to the Internet or other network for the people occupying the space, via their portable or mobile devices. As such, access points are typically always on so that the wireless network is available whenever suitable portable or mobile devices are carried into the space.

The use of different technologies for WLAN and wireless PAN connectivity increases cost, weight and power usage (at the COORD side and/or the PER side), and impairs a seamless user experience. Those disadvantages could be resolved by equipping the peripheral or PAN nodes with 802.11x wireless circuitry, thus eliminating the dedicated PAN technologies altogether. However, PAN nodes are often very power-sensitive devices. They usually are battery-operated devices and their small form factor prohibits the use of bulky batteries with large capacity. Instead, small batteries with limited power capacity are used. Such peripherals cannot typically support the power usage requirements typical of WLAN wireless circuitry, such as 802.11x circuitry. A host of other difficulties are present in view of the optimizations, goals and designs of differing network protocols.

Another drawback is that independent LANs and PANs may interfere if they share a common frequency band.

BRIEF SUMMARY OF THE INVENTION

In embodiments of wireless communication according to the present invention, devices in a secondary network operate using an overlay protocol that enhances co-existence with a primary network. In a specific example, the primary network is an 802.11x network and the secondary network is a network that uses the overlay protocol for communications with devices that cannot directly support an 802.11x network because of latency, power, computing effort, or other limitations, but where the secondary network and primary network need to co-exist. The secondary network might entirely comprise devices that are only capable of joining the secondary network, but the secondary network might also comprise devices that can join, or have joined, the primary network. The overlay protocol is preferably such that devices that can join both networks can use a common network interface circuit.

In specific embodiments, a computing device is interfaced to a wireless local area network (WLAN) and a wireless personal area network (PAN). A network circuit, comprising logic and at least one antenna, interfaces the computing device to the WLAN and including logic to set up a LAN association between the computing device and the access point prior to data transfer therebetween, while also interfacing the computing device to a PAN device via the wireless PAN.

Communication with the wireless PAN device might use an SWN protocol that is only partially compliant with the protocol used over a conventional WLAN and might do so without interference from the conventional WLAN, yet usage of the WLAN is such that the wireless PAN device and computing device can communicate without interference. To reduce interference, the computing device coordinates the usage of the wireless medium with devices of a WLAN that may be active in the same space. Coordination is achieved by the use of a secondary network (PAN) protocol that is an overlay protocol that is partially compatible with the WLAN protocol, but not entirely, in terms of power, frame contents and sequences, timing, etc. The secondary network (PAN) protocols might be 802.11x frames with new frame arrangements adapted for PAN needs, such as reduced latency, power etc. The computing device might determine to signal the primary network (WLAN) such that devices therein defer so that communications can occur with the secondary network.

In specific implementations, a shareable network circuit stores parameters, addresses and other information necessary to maintain sessions with both networks simultaneously. As an example, a shareable network circuit may store two media addresses, one for communication in the WLAN and one for communication in the wireless PAN. The network circuit can maintain sessions with both simultaneously. More than two networks and corresponding storage of parameters, addresses and additional network related information might be provided for. A recognition method is provided in the computing device to distinguish and separate traffic from different networks.

In the computing device, the network circuitry for a device that operates in multiple networks might be coupled to different standard drivers, such as an 802.11x PHY and MAC layers coupled to a convergence layer that in turn is coupled to higher-layer drivers such as standard networking drivers, an IP stack, a Human Interface Device (HID) class driver, and/or a standard USB stack. The convergence layer might allow for multi-protocol support, exposing and coordinating access to specific MAC service primitives and coordinating priority handling in Quality-of-Service (QoS) sensitive applications. The convergence layer may be explicit, or may be integrated with the PHY and MAC layers.

To conserve power at the wireless PAN device and the computing device, they can agree on an inactivity time and disable at least a part of a coordination function of the computing device following a start of the inactivity time, wherein disabling is such that less power per unit time is consumed by the network circuit relative to power consumed when not disabled.

In addition to communicating between such network circuitry and an AP as part of WLAN traffic, similar techniques might also be used where the network circuitry is communicating with another station in an ad hoc mode rather than an AP in infrastructure mode. Alternatively, the computing device may be acting as the AP for the WLAN network.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 3 comprises several examples of elements of a PWN and an SWN.

DESCRIPTION OF THE INVENTION

Figure 1:
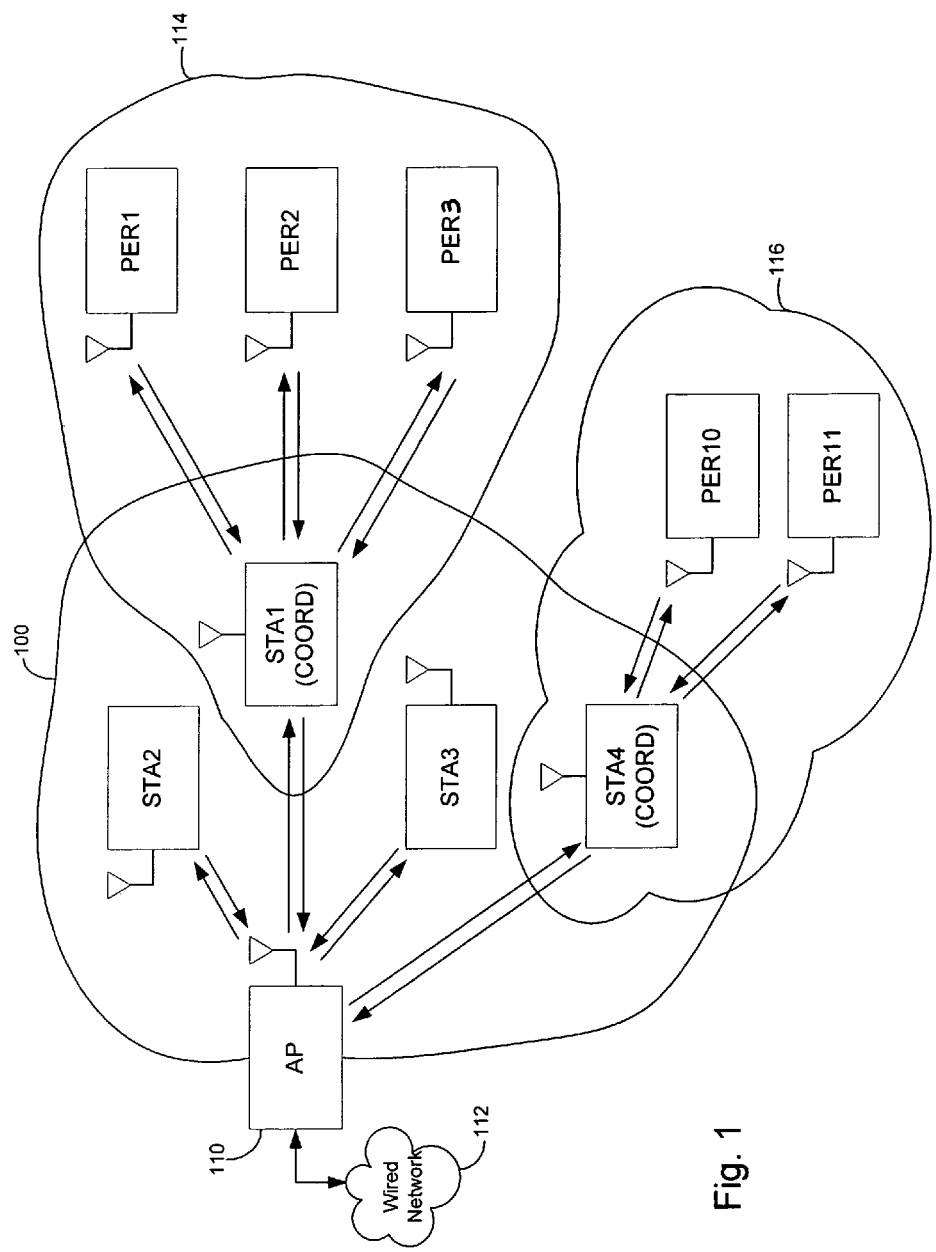
FIG. 1 is a block diagram illustrating various devices operating as part of a primary wireless network (PWN), a secondary wireless network (SWN), or both, wherein the SWN operates using an SWN protocol that co-exists with the PWN protocol.

The present disclosure describes methods and apparatus for operating a secondary wireless network ("SWN") in the presence of a primary wireless network ("PWN"), including features, elements, configurations and/or programming that allow for co-existence of SWN devices in a space where PWN traffic might occur, as well as features, elements, configurations and/or programming that include coordination between a PWN and an SWN (or pluralities of these) such that a device might handle traffic for each of the networks present.

For example, a computing device might have a common network interface that allows the computing device to be a node in the PWN and a node in the SWN. In a particular example, a computing device is an 802.11x STA that is a member of a PWN capable of associating with and communicating with an AP for that PWN (as well as possibly other devices in that PWN) using a network interface while also elements of that same network interface are used to simultaneously participate as a WPAN coordinator ("COORD") to coordinate the SWN, such that the COORD can communicate with members of one or more SWN without losing the COORD's connectivity to the primary network and using common hardware components to interface to both networks. Where a COORD is connectable to the PWN, it is referred to as a "dual-net" device, as it coordinates communication over the SWN such that it can be connected to both simultaneously, possibly including steps that involve signaling within the PWN as part of SWN activity (e.g., reserving the PWN to avoid interference before using the SWN).

In some instances, the COORD is not set up to connect to the PWN, but it still performs the necessary actions to coordinate traffic for the SWN it coordinates, including performing actions that improve coexistence of the PWN and SWN.

In the general example, the computing device is a portable and/or mobile computing and/or communications device with some computing capability. Examples of computing devices include laptop computers, desktop computers, handheld computing devices, pagers, cellular telephones, devices with embedded communications abilities and the like. Examples of peripheral devices include typical computer, telephone etc. accessories where wireless connections are desired, but might also include less common devices, such as wearable devices that communicate with other devices on a person or even to communicate with other nearby devices, possibly using the electrical conductivity of the human body as a data network. For example, two people could exchange information between their wearable computers without wires, by transmission through the air, or using their bodies and/or clothing.

The computing devices may interface to 802.11 WLANs or other wireless networks to communicate with other network nodes, including nodes accessible through wired connections to the wireless network (typically via an access point). The computing devices also may interface to PAN devices over a personal area network (PAN), such as wireless headsets, mice, keyboards, accessories, recorders, telephones and the like. A wide variety of PAN devices are contemplated that are adapted for short-range wireless communications, typically bi-directional and typically low power so as to conserve a PAN device's limited power source. Some PAN devices might be unidirectional, either receive-only or transmit-only, devices.

In a typical approach, where a STA needs to connect to more than one wireless network, the STA associates with one wireless network and then when associating with another wireless network, it disassociates with the first wireless network. While this is useful for a WLAN where a STA might move out of one network's range and into the range of another network, this is not desirable when latency needs to be less than an association set-up time. The latency incurred with this switching procedure easily amounts to several hundreds of milliseconds.

In certain applications, it may be desirable for a STA to connect to multiple networks without incurring long switching-induced latencies. For example, consider a typical PER device, that of a cordless mouse. Since update rates for a cordless mouse during normal operation are on the order of 50 to 125 times per second, switching-induced latencies involved with 802.11x association set ups are not acceptable. Furthermore, the switching overhead significantly reduces the STA's usable communication time, defined as the time that the STA is available to transmit or receive data.

In a specific embodiment of the invention, a wireless peripheral like a mouse, is attached to an 802.11x-enabled computing device like a laptop computer, using the 802.11x wireless circuitry inside the laptop, or connected to the laptop via a NIC card. At the same time, the laptop may be connected to the Internet via a regular WLAN network, using the same 802.11x circuitry. Herein, a peripheral or PAN node will be referred to as "PER". Multiple PERs can connect to a single wireless PAN. The wireless device coordinating the wireless PAN is called the coordinator ("COORD"). Where the COORD is also able to connect to the 802.11x network, the COORD is referred to as a "dual-net" device, since it handles both networks. A typical dual-net device in this example is a device that is a STA on an 802.11x network while also having wireless peripherals used by applications running on that device.

While not always required, the PERs are power-sensitive devices. It should be understood that an object labeled "PER" need not be a peripheral in the sense of an object with a purpose to serve a particular purpose, but rather an object that performs the behaviors herein referred to as behaviors of a PAN node. For example, a printer can be a PER when it is connected to a desktop computer via a PAN, but some other device not normally thought of as a peripheral can be a PER if it behaves as one.

Examples of the concepts and disclosures provided above will now be further explained with reference to the figures. In the figures, like items are referenced with a common reference number with parenthetical numbers to indicate different instances of the same or similar objects. Where the number of instances is not important for understanding the invention, the highest parenthetical number might be a letter, such as in "100(1), 100(2), . . . , 100(N)". Unless otherwise indicated, the actual number of items can differ without departing from the scope of this disclosure.

Specifically, FIG. 1 illustrates various devices operating as part of a primary wireless network (PWN) 100, a secondary wireless network (SWN) (such as 114 or 116), or both. In the figure, an access point (AP) 110 supports an infrastructure mode for PWN 100, coupling various stations to the network allowing, for example, network traffic between a station and a wired network 112. By communicating with the AP, a station can retrieve information from the Internet and exchange data with other stations that may or may not be part of the Basic Service Set (BSS) managed by the AP.

As shown in the example, the stations present are STA1, STA2, STA3 and STA4. Each station is associated with a node in PWN 100 and has the necessary hardware, logic, power, etc. to be a node device in PWN 100. Station STA1 also coordinates SWN 114 as the COORD for that network shown comprising PER1, PER2 and PER3. Likewise, station STA4 coordinates SWN 116 as the COORD for the network comprising STA4, PER10 and PER11. In FIG. 1, each node device is shown with an antenna to indicate that it can communicate wirelessly, but it should be understood that an external antenna is not required.

Other network components and additional instances might also be present. For example, more than one AP might be present, there might be overlaps of BSSes and other network topologies might be used instead of the exact one shown in FIG. 1 without departing from the scope of the invention. Examples used herein for PWN 100 include 802.11x (x=a, b, g, n, etc.), but it should be understood that the primary wireless network may well be another network selected among those in present use or available when the primary wireless network is implemented.

In this example, the secondary wireless networks are assumed to be used for PAN functionality. The PAN can be used for, but is not limited to, fixed data rate applications where exchange of data can be scheduled and the amount of data to be exchanged is known and a single dual-net device might interface with multiple PERs. Because the dual-net device may be a regular STA in the first WLAN, it can power-down as needed without problems, unlike an access point. However, since it is also the COORD, peripheral communication could be lost if the peripheral is powered up but the dual-net device/COORD is not. This can be dealt with using mutually agreeable inactivity periods.

Figure 2:
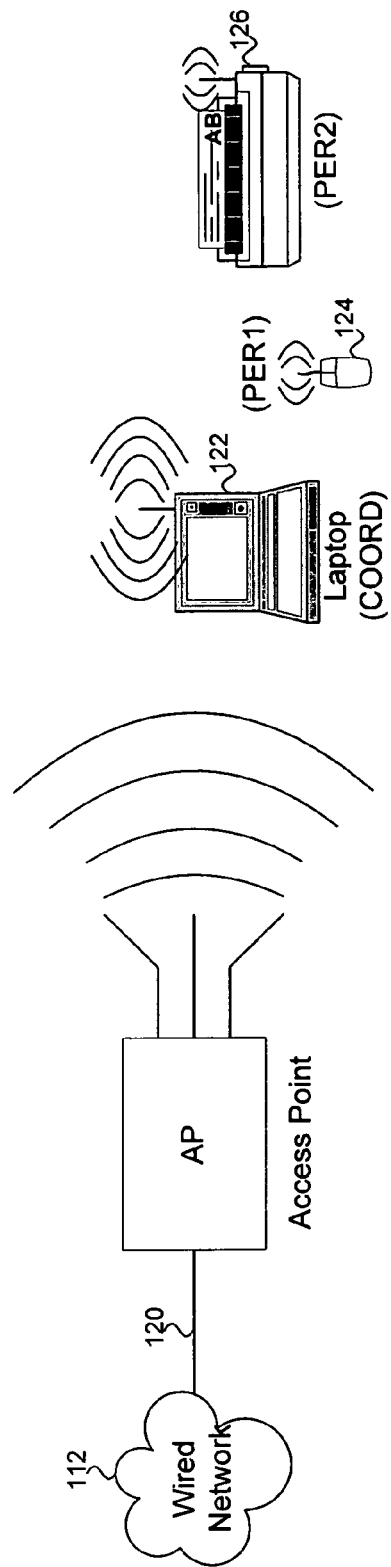
FIG. 2 is a block diagram illustrating a subpart of the elements of FIG. 1, in greater detail.
Figure 3A:
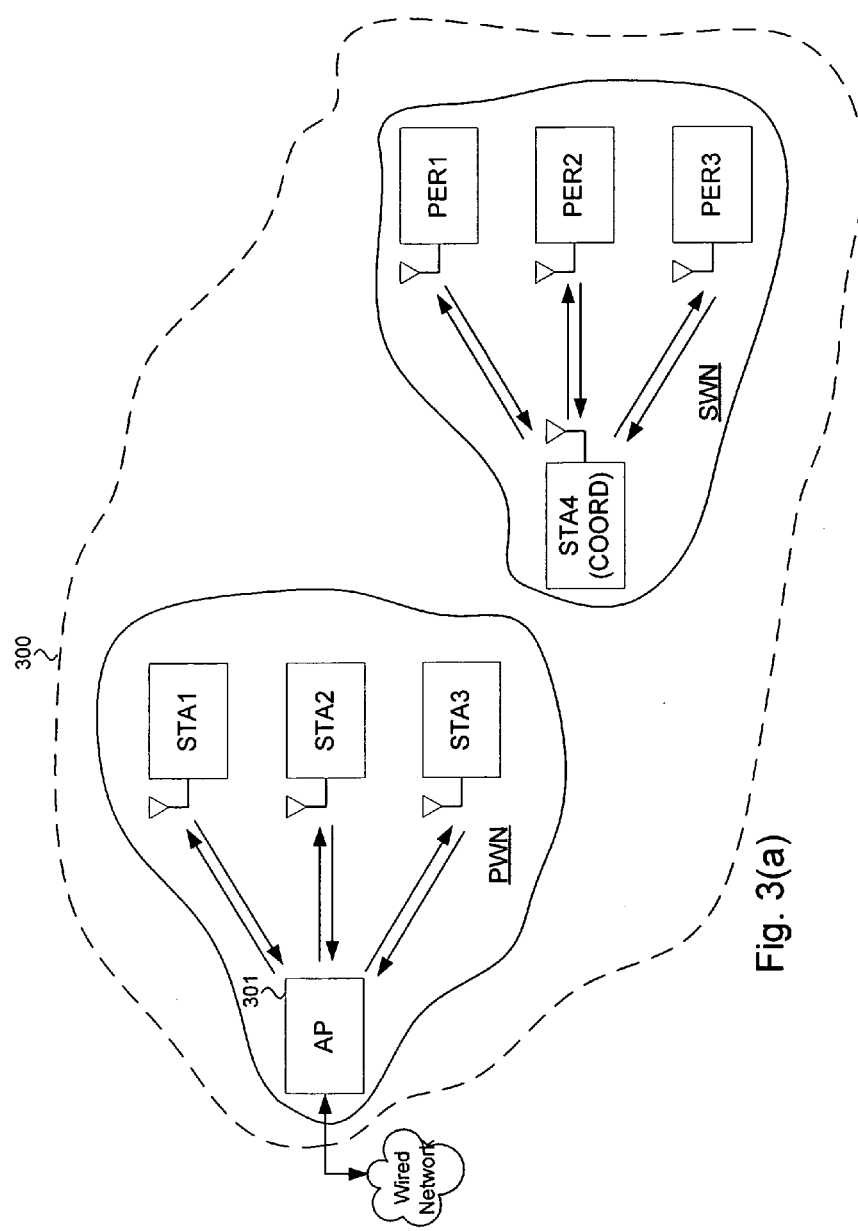
FIG. 3(a) is a block diagram showing elements of a PWN and an SWN that co-exist, but do not necessarily span the two networks.
Figure 3B:
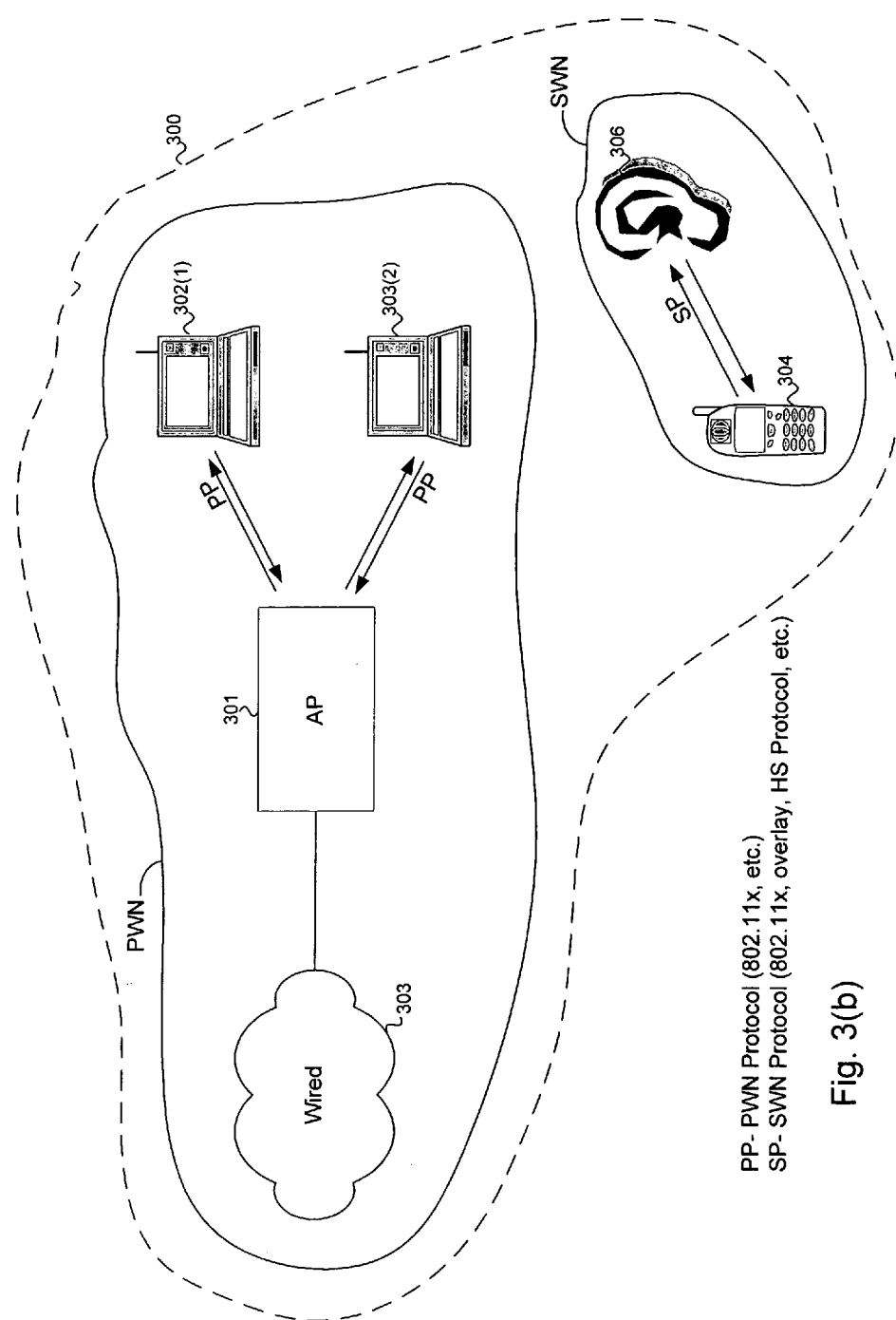
FIG. 3(b) is a block diagram showing specific objects that might be used as the elements of a PWN and an SWN.
Figure 3C:
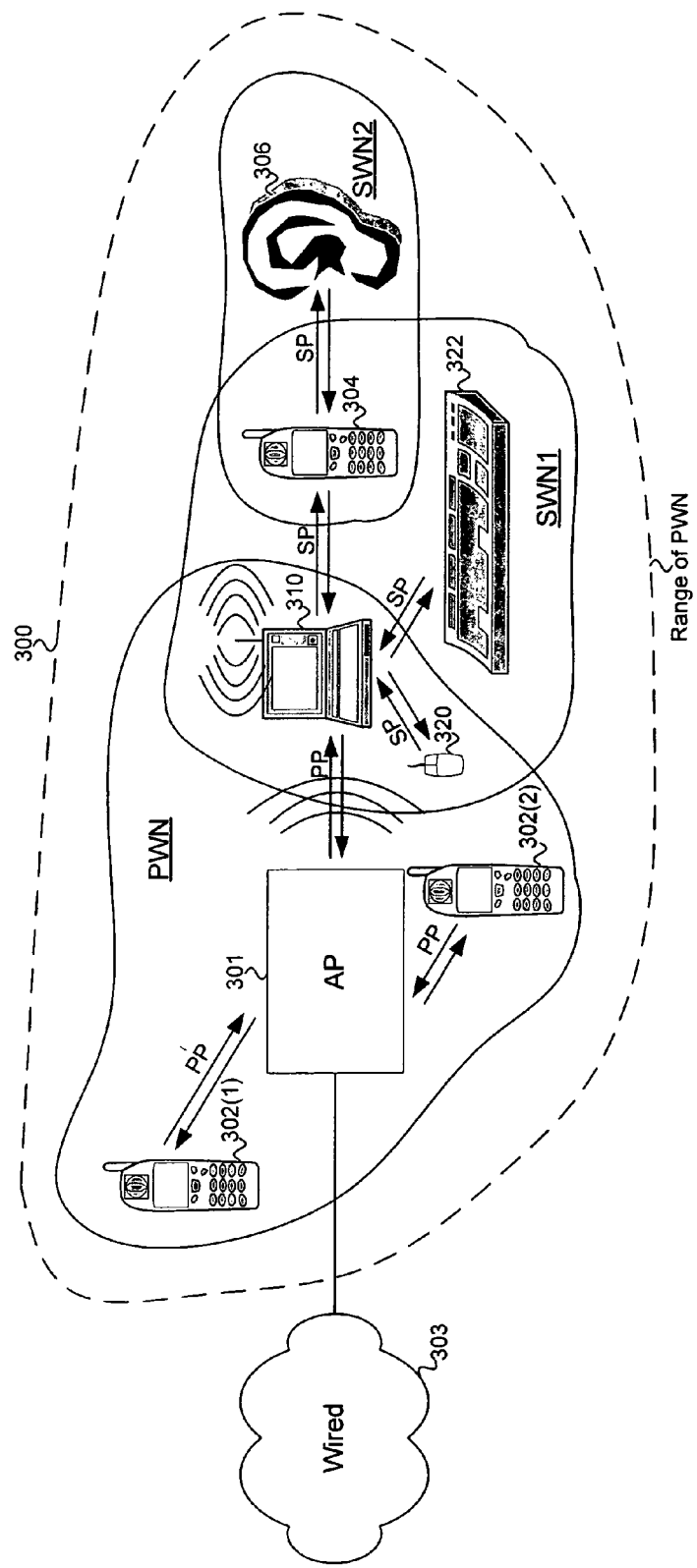
FIG. 3(c) is a block diagram of a variation of subparts wherein objects might span the PWN and the SWN.
Figure 3D:
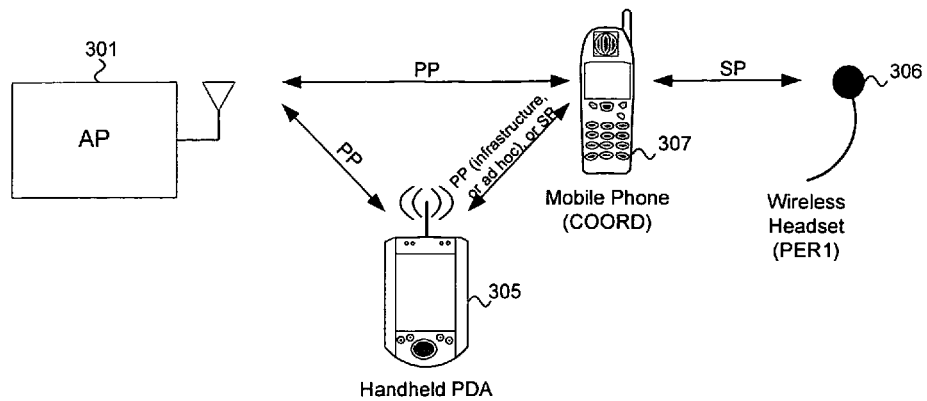
FIG. 3(d) is a block diagram showing further examples.

FIG. 1 shows, at a high level, the interplay among various nodes of various networks. FIG. 2 illustrates a subpart of the elements of FIG. 1, illustrating in greater detail. In this figure, AP 110 is coupled to wired network 112 via cable 120 and might communicate using any suitable wire-based networking protocol. On the other side, AP 110 transmits signals to a station device, in this case a laptop 122, using the AP's antenna and those signals are received by laptop 112 using its antenna. Signals can also flow in the other direction. Such communications would be done according to a PWN protocol, such as an 802.11x protocol.

Laptop 122 (a dual-net device in this example) in turn can communicate with the peripherals shown, in this example a wireless mouse (PER1) 124 and a wireless printer (PER2) 126. It may be that power for wireless printer 126 comes from an external power outlet, in which case power consumption might be less of a concern than with mouse 124 if it operates on battery power. Nonetheless, both peripherals might use the same power-saving protocol. Power conservation might also be performed on the dual-net device, for example, when it is a laptop.

FIG. 3 comprises several views of network layouts of elements of a PWN and a SWN.

FIG. 3(*a*) is a block diagram showing wireless elements that might be operating in a common space 300 such that they share a wireless medium or parts of it. In the description that follows, the examples assume that the range of an access point, AP 301, is the common space 300. In other examples, the common space is the range of the AP and STA devices in the AP's BSS, or some other variation. As shown in FIG. 3(*a*), AP, STA1, STA2 and STA3 form the primary wireless network PWN, while devices STA4, PER1, PER2, and PER3 form the secondary wireless network SWN. STA4 is the master for the SWN. Note that STA4 need not be associated as a STA with AP 301.

FIG. 3(*b*) illustrates a more specific example. In that figure, PWN is managed by AP 301 and has node devices 302(1) and 302(2) (laptops in this example figure) associated with the PWN. A mobile phone 304 is the master for the SWN that includes a headset 306. Mobile phone 304 may well not have the capability to join PWN, but since the PWN and SWN share the same wireless medium, preferably mobile phone 304 has COORD functions that would enhance coexistence of PWN devices and SWN devices. AP 301 is also coupled to a wired network 303.

The various protocols used between devices are marked as "PP" for PWN protocol, which might be an 802.11x protocol or the like and "SP" for SWN protocol, which might be a modified 802.11x protocol, an overlay protocol, or the like. As used herein, an overlay protocol is an SWN protocol that has elements that are reuses of elements of a PWN protocol to provide one or more advantages, such as ability to use some common hardware components for both networks, the ability to communicate in the SWN without having to disassociate with the PWN, the ability to signal in the SWN with signals that are understood by SWN devices but are such that they are, if not understood, are acted upon by PWN devices to provide desirable actions. For example, an overlay protocol might be such that a PWN-only device that hears an SWN packet will be able to decode the packet enough to determine that the packet is not for the PWN-only device and also determine how long the wireless medium will be busy with SWN traffic so that the PWN-only device can appropriately defer.

Of course, if all of the PWN devices and SWN devices had the same constraints and could support a wider-area network standard protocol, then perhaps all of the devices would just be nodes in one network and use that network's protocol for contention, coordination, and the like. However, where one-size-fits-all does not work, it is preferred that some sort of coexistence enhancement occur.

FIG. 3(*c*) is a block diagram of another topology example, wherein at least one device spans a network. In that example, AP 301 communicates with an 802.11x-enabled Personal Digital Assistant (PDA) 305 and an 802.1x-enabled mobile phone 307, while phone 307 acts as a COORD for a secondary network to interact with a wireless headset 306. In some variations, PDA 305 and phone 307 might communicate in ad hoc mode. As an example of the use of these elements, phone 307 might be used to simultaneously conduct a wireless Voice-over-IP (VoIP) call and attach wireless headset 306.

FIG. 3(*d*) is a block diagram illustrating a more complicated example. As shown there, AP 301 is coupled to wired network 303 and is wirelessly coupled with its associated stations: laptops 302(1) and 302(2), as well as a laptop 310 that is a COORD for a secondary wireless network, SWN1. Laptop 310 coordinates SWN1, which includes mouse 320, keyboard 322 and mobile phone 304. Mobile phone 304 can in turn be a COORD for another secondary wireless network, SWN2 while being a PER in SWN1. As shown, the communications with AP 301 use a PWN protocol, such as an 802.11x protocol, while the communications among devices in SWN1 and SWN2 are done using the SWN protocol. As explained elsewhere herein, there are many benefits of using an SWN protocol such as an 802.11x overlay instead of an all 802.11x protocol and by suitable design of the SWN protocol, the SWNs and the PWN can co-exist and, in the case of dual-net devices, can reuse common network interface devices for the dual-net device's participation in both a PWN and an SWN.

In the example of FIG. 3(*d*), it may be expected that mouse 320, keyboard 322, mobile phone 340 and headset 306 are not programmed for, and/or do not have circuits to support, use with an 802.11x primary network, but nonetheless they might use an SWN protocol that has many aspects in common with an 802.11x protocol, modified to accommodate the different needs of SWN devices while providing a measure of co-existence. The network interface for a dual-net device might comprise standard hardware for interfacing to the PWN and software to control that standard hardware to use it for SWN protocol traffic. Thus, with the selection of the SWN protocol such as those described or suggested herein, SWN support can be added to a computing device without requiring any new hardware.

Figure 4:
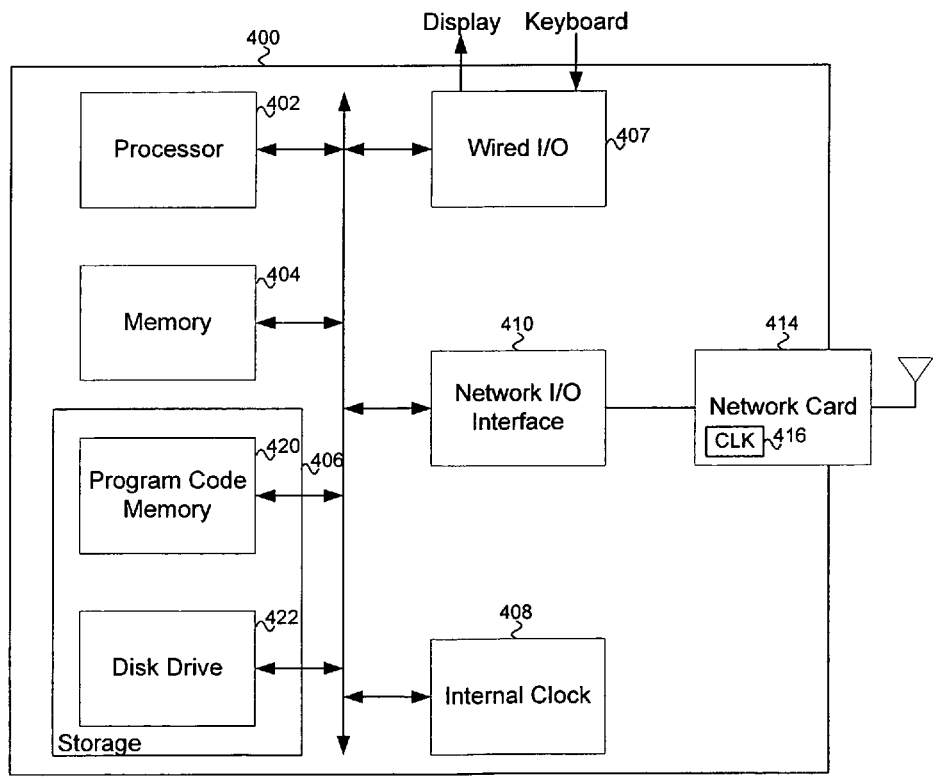
FIG. 4 is a block diagram of an example wireless PAN coordinator ("COORD") that might also operate as a dual-net device that could simultaneously maintain connections with a PWN and a SWN.

FIG. 4 illustrates an example of the internal details of a COORD device. As explained herein, such devices might include laptops, desktop computers, terminals, MP3 players, home entertainment systems, music devices, mobile phones, game consoles, network extenders or the like. What is shown is one example. In this example, a COORD device 400 is shown comprising a processor 402, the memory 404, program and software instruction storage 406, a wired input/output interface 407 for displays, keyboards and the like, an internal clock 408, and a network I/O interface 410, each coupled to a bus 412 for intercommunication. Network I/O interface 410 is in turn coupled to a network card 414, which includes its own circuitry such as an internal clock 416 and other components not shown. In some cases, the network card is not distinct and in some cases there might not even be much hardware associated with the networking function if it can be done by software instructions.

Program and software instruction storage 406 might comprise program code memory 420 and disk drive 422. Program instructions for implementing computing, communication, etc. functions, as well as network interfacing, can be stored in program code memory 420 and might be loaded in there from instructions stored on disk drive 422. Program code memory 420 might be just a portion of a common memory that also has memory 404 as a portion. For example, both memories might be allocated portions of RAM storage so that instructions and data used by programs are stored in one memory structure. With a general purpose, network-centric, signal processing-centric or other style of processor, functional modules that might be illustrated by blocks in a block diagram might be implemented entirely in software, embodied only in code stored in computer readable media. However, when executed as intended, the processor and the stored instructions perform the functions of those modules. For example, a device might be described as having a network stack that performs certain functions, but the network stack might not be represented in individual hardware elements.

Figure 5:
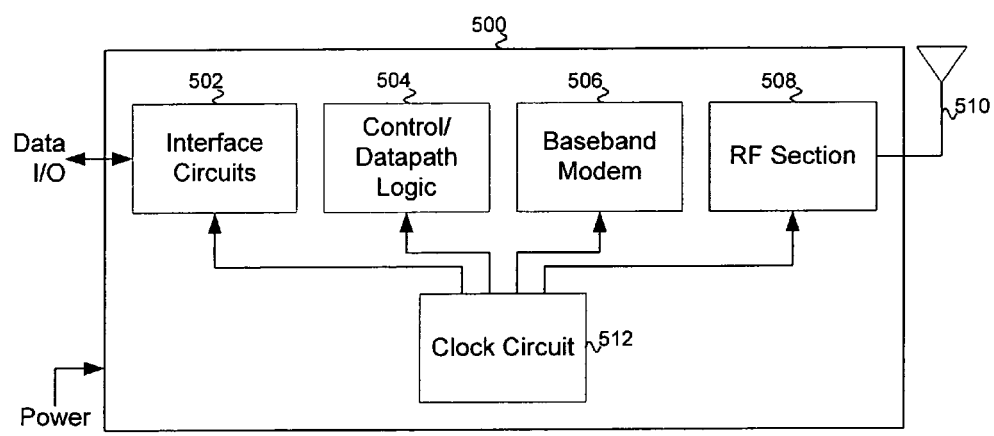
FIG. 5 is a block diagram of a network card that might be used to interface a COORD/dual-net device to the various networks.

FIG. 5 illustrates an example of a network card 500, shown comprising interface circuits 502 for interfacing network card 500 to a computing device (not shown), control/datapath logic 504, baseband modem circuitry 506, an RF section 508, an antenna 510 and a card clock circuit 512. Control/datapath logic 504 is configured to send and receive data to and from the computing device via interface circuits 502, send and receive data to and from baseband mode circuitry 506 and process that sent or received data as needed. Card clock circuit 512 might provide circuit clocking services as well as real-time clock signals to various other elements of network card 500. Note that logic elements shown and described might be implemented by dedicated logic, but might also be implemented by code executable by a processor. For example, some of the control/datapath logic's functionality may be implemented in software rather than hardware. An example processor is the ARM7 processor available from ARM Limited of London, England.

In operation of an example network card, power might be supplied via interface circuits 502 as well as providing a wired datapath for data into and out of the network card. Thus, when the connected computing device desires to send data over the network(s) supported by the network card, the computing device sends the data to an input circuit of interface circuits 502. The input circuit then conveys the data to control/datapath logic 504. Control/datapath logic 504 may format the data into packets if not already so formatted, determine the PHY layer parameters to use for the data, etc., and possibly other processes including some well-known in the art of networking that need not be described here in detail. For example, logic 504 might read a real-time clock from card clock circuit 512 and use that for data handling or include a real-time clock value in header data or other metadata.

Logic 504 then outputs signals representing the data to baseband modem circuitry 506 which generates a modulated baseband signal corresponding to the data. That modulated baseband signal is provided to RF section 508. The timing of output of signals of logic 504 and other parts of the network card might be dictated by a timing clock signal output by card clock circuit 512. RF section 508 can then be expected to output an RF, modulated signal to antenna 510. Such output should be in compliance with requirements of nodes of the networks with which the computing device is associating.

For example, if the computing device is expecting to be associated as a node in an 802.11b network, the signal sent to antenna 510 should be an 802.11b compliant signal. Also, the control/datapath processes should process data in compliance with the requirements of the 802.11b standard. Where the computing device is expecting to be a dual-net device, the signals sent should be compliant with the protocols and/or standards applicable for the network to which the signals are directed, and be done in such a way as to deal with the fact that while communication is happening among devices of one network (such as the primary wireless network or the secondary wireless network), those signals might be heard by devices that are only devices in a different network (such as the secondary wireless network, the primary wireless network or other network) and the signals should be such that devices can at least co-exist.

Where the computing device is a dual-net device, its network card would provide signals for the primary network and the secondary network. In one example mentioned herein, the primary network is an 802.11x network and the computing device is a STA node for that network and the secondary network is a PAN and the computing device is the COORD for that network. In some implementations, network communications are handled using a software platform that supports network applications.

In some embodiments, wherein 802.11x or other PWN protocols do not need to be supported, the built-in wireless circuitry or network card could be designed to handle only SWN protocols, as would be the case where the network comprises all devices that are capable of handling SWN protocol communications. Examples of such protocols include protocols that operate between devices built by H-Stream Wireless, Inc. to communicate using an H-Stream protocol such as their HSP protocol. In some HSP-enabled devices, the network logic can be entirely represented with software that accesses the RF section of a device that might be a generic network interface, possibly using additional hardware. However, where both ends are HSP-enabled devices, they might use their own hardware and control it at whatever level is needed for best performance.

Figure 6:
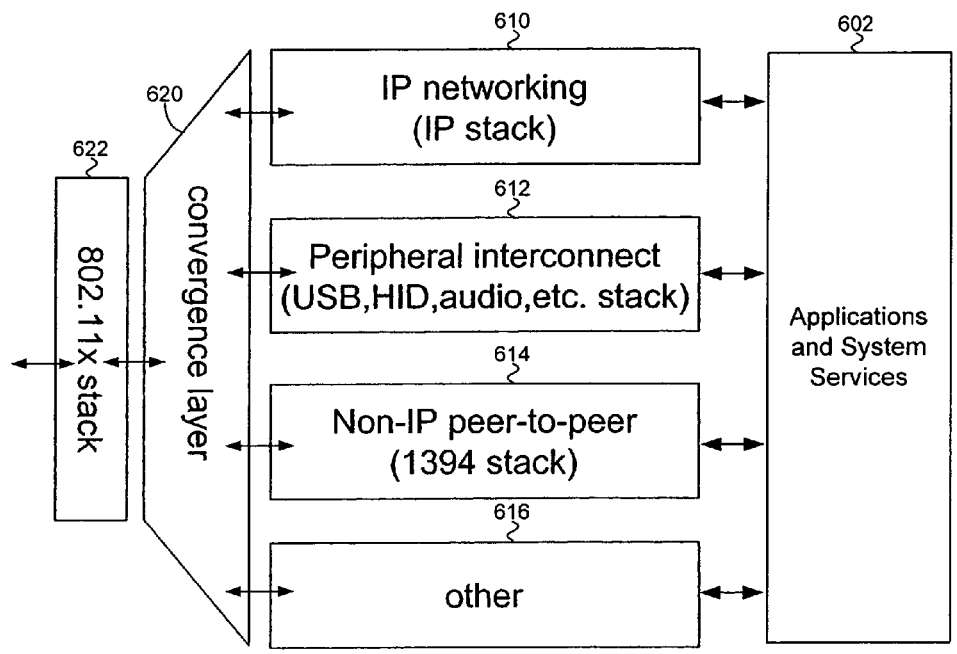
FIG. 6 is a block diagram of software components that might comprise software and/or logical constructs to interface applications with the networks supported by a COORD/dual-net device.

FIG. 6 illustrates a platform 600 as it might be present in a dual-net device, that represents software and/or logical constructs that together can be thought of as logical elements available for processing data within the computing device. As such, they need not be implemented as separate hardware components or distinct software components, so long as their functionality is available as needed. Other variations are possible, but in the layout shown, applications and system services (shown as block 602) are programmed to interface to various stacks, such as an IP networking stack 610 (sometimes referred to as an "IP stack"), a peripheral stack 612 (USB, HID, audio, etc.), a non-IP stack 614 (for IEEE 1394 interfacing) or other stack 616. For example, an application such as an HTTP browser might expect to communicate using TCP/IP and thus that application would have been configured to communicate with the computing device's IP stack.

A convergence platform can be added between an 802.11x stack and the different drivers to enable multi-protocol support, expose and coordinate access to specific MAC service primitives and coordinate the priority handling in Quality-of-Service (QoS) sensitive applications. This convergence platform can be a separate software layer or can also be integrated within the 802.11x stack.

For certain stacks, additional services may be required that might not be supported inside the 802.11x stack. If that is the case, such overlay protocol services may reside either inside the convergence layer or in between the convergence layer and the respective stack. As an example, communication with peripherals may require protocol services in addition to the protocol services provided by the 802.11x stack in order to meet the power and latency requirement typical of such applications. Such protocol services may be part of the convergence layer, or may reside in between the convergence layer and the Peripheral Interconnect Stack. Of course, as an alternative, the 802.11x stack may have been adapted to support such services.

Each of the stacks 610-616 is shown coupled to a convergence layer 620, which provides the necessary and/or optional conversions of data, protocol, timing, etc. so that each of the higher level stacks 610-616 are interfaced to an 802.11x stack 622. 802.11x stack 622 can then interface to the computing device's network card (or other network circuitry). In this manner, for example, stack 622 might handle a browser's traffic that goes through IP stack 610 while also handling a mouse interface whose traffic goes through peripheral stack 612. Note that with a single 802.11x stack, a single network interface can carry traffic for more than one higher-level stack. The single network interface needs to be tuned to deal with the different requirements of the different stacks.

Communication protocols can be implemented with drivers or firmware that is installed on the dual-net device/CO-ORD. The drivers or firmware might comprise an 802.11x peripheral service function (e.g., for implementing the services of the overlay protocol that are not supported inside the 802.11x stack), which can be application-independent, and an adapter driver to connect the 802.11x stack and 802.11x peripheral service function to the appropriate driver inside the dual-net device/COORD platform. The adapter driver may be device class or device specific.

Figure 7:
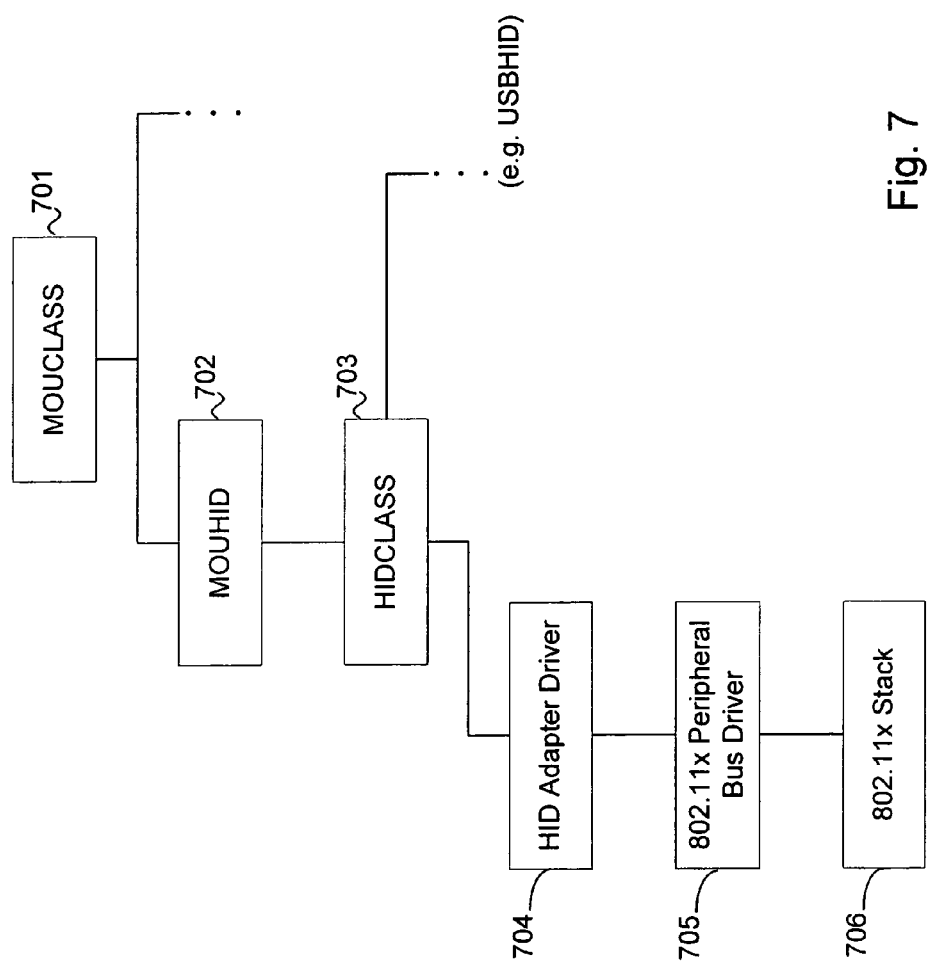
FIG. 7 is a block diagram of classes and objects that might be used in an interface between a network and applications.

An example of this is illustrated in FIG. 7 for a wireless PAN where a mouse is connected over the WM to the standard HID class driver in a PC running on the Windows (or other applicable Operating System (OS)). The driver or firmware resides between the 802.11x stack 706 and the standard HID class driver 703. In a specific implementation, the driver or firmware can constitute an HID adapter driver 704 and an 802.11x peripheral bus driver 705.

Other variations of what is shown in FIG. 7 are possible. For example, the 802.11x peripheral service function might connect up to the MOUHID driver 702 directly. In that case, the HID adapter driver is written as an HIDCLASS miniport driver. This driver then layers under the MOUHID 702 and MOUCLASS 701 drivers and allows mouse data to be injected into the operating system.

Alternatively, the adapter driver may connect to the USB stack instead. The adapter driver may, for example, be written as a virtual USB bus driver and connect up to the standard USB stack available as part of the operating system or operating system modifications. Depending on the specific implementation, the adapter driver may connect at different layers into the USB stack.

In specific embodiments, the 802.11x peripheral service function and adapter driver may be combined in a single driver. Alternatively, two separate drivers may be used and a private interface might be defined and used between both drivers.

The adapter driver receives the 802.11x frames from the 802.11x peripheral service function that are intended for the higher layer driver (e.g., MOUCLASS driver). Similarly, the adapter driver receives frames from the higher layer driver that are to be transmitted to a PER using the 802.11x circuitry. The adapter driver and 802.11x peripheral service function generate and decode the necessary packet header for running a specific application, like the HID protocol, over an 802.11x data channel. For example, it removes the 802.11x-specific MAC header and performs the necessary manipulation to transform it in the correct format to be passed on to the respective class driver.

Figure 8:
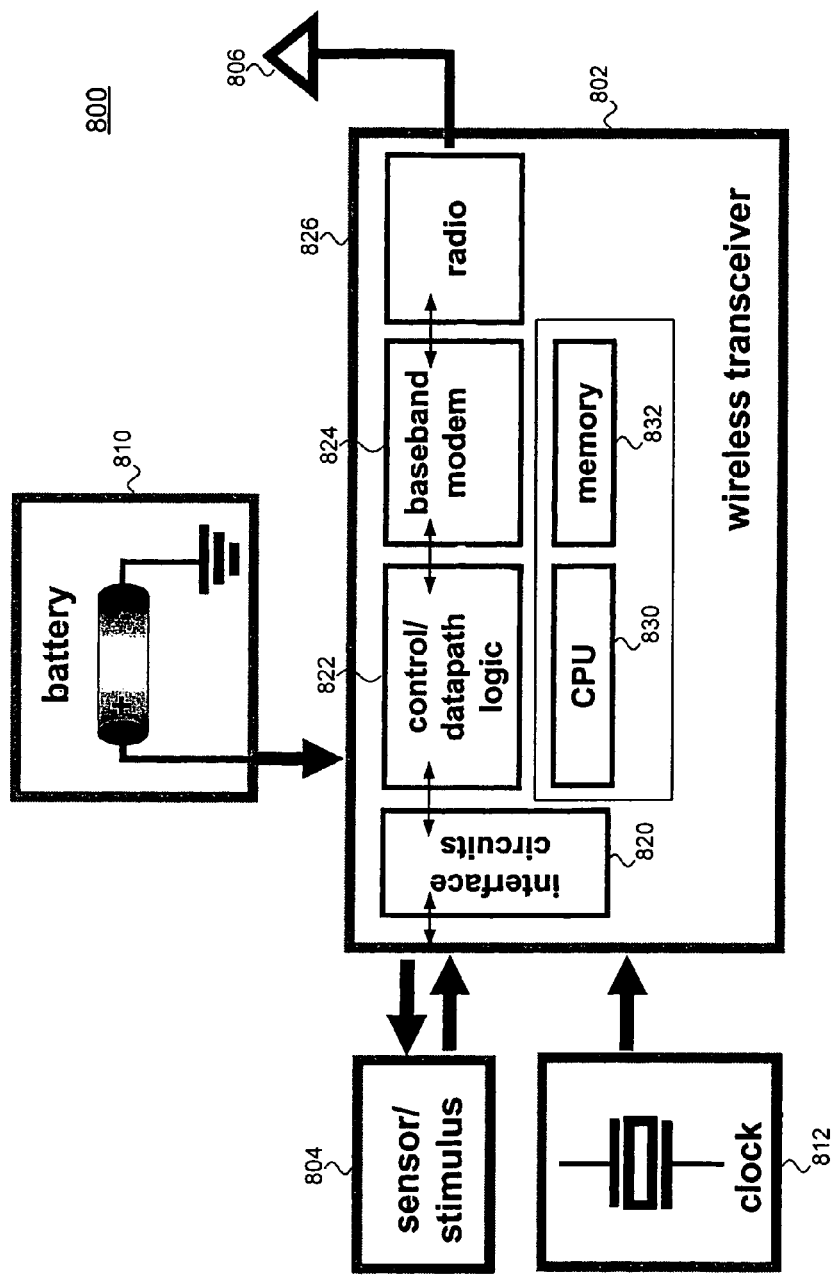
FIG. 8 is a block diagram of an example of a PER device.

FIG. 8 is a block diagram illustrating an example of what might be the components of a PER device. As shown, PER 800 comprises a wireless transceiver 802 coupled to sensor/stimulus elements 804 and antenna 806. Additional components, such as a filter, a balun, capacitors, inductors, etc., may be present between wireless transceiver 802 and other elements. Generally, wireless transceiver 802 allows other networked devices to understand results of sensing (in the case of a PER that does sensing, such as a mouse, microphone, remote condition sensor, etc.) and/or to specify stimulus (in the case of a PER that outputs visual, audio, tactile, etc. outputs, such as a printer, headset, etc.). It should be understood from this disclosure that PER can be a wireless input and/or output device and in many cases, the wireless transceiver can be designed independent of the particular input and/or output.

FIG. 8 also shows a battery 810 and a clock circuit 812. Battery 810 provides power for wireless transceiver 802 and elements 804 as needed. As weight and portability are likely to be important in the design of the PER, battery consumption will often have to be minimized for a good design. Clock circuit 812 might provide real-time clock signals as well as providing circuit timing clock signals.

As shown, wireless transceiver 802 comprises interface circuits 820, control/datapath logic 822, a baseband modem 824, and an RF section 826. Control/datapath logic 822 might be implemented with circuitry that includes a central processing unit (CPU) 830 and memory 832 for holding CPU instructions and variable storage for programs executed by CPU 830 to implement the control/datapath logic. Control/datapath logic 822 might include dedicated logic wherein CPU 24 and memory module 25 implement the portion of the communication protocol that is not implemented in the dedicated control and datapath logic. The CPU instructions might include digital signal processing (DSP) code and other program code. The other program code might implement MAC layer protocols and higher-level network protocols.

Clock circuit 812 might include a crystal oscillator. Clock circuit 812 might be aligned with clocks in other network devices, but the clocks may drift over time relative to each other.

Although not shown, other components like capacitors, resistors, inductors, filters, a balun, a Transmit/Receive (T/R) switch, an external power amplifier (PA) and an external low-noise amplifier (LNA) may also be included in PER 800.

Wireless transceiver 802 might be configured so as to communicate over the physical layer (PHY) of a standard IEEE 802.11-compliant circuit chip. Wireless transceiver 802 may be an embedded System-on-Chip (SoC) or may comprise multiple devices as long as such devices, when combined, implement the functionality described in FIG. 8. Other functionality, in addition to the functionality of FIG. 8 may also be included. Wireless transceiver 802 might have the ability to operate, for example, in the unlicensed 2.4-GHz and/or 5-GHz frequency bands.

One or more of the techniques described herein might be used to allow a computing device to maintain sessions with multiple networks simultaneously using the same networking hardware to join both networks even with differing network requirements.

PAN devices often require less latency than is allowed between networked devices that use a WLAN to communicate. As an example, the latency requirements for transmitting mouse movements from a mouse to a laptop, desktop or the like are on the order of tens of milliseconds, whereas latencies incurred in a conventional WLAN network may be several hundreds of milliseconds or even higher. WLAN latencies do therefore not meet wireless PAN latency needs.

In one approach to dealing with latency, the 802.11x frame structure is modified for PAN traffic, wherein headers and fields not needed for communication between the COORD and the PER are eliminated. Often, this requires low-level access to network card functions, so these techniques might be limited by the hardware and features available.

Power conservation may tend to be more critical in a PER device than in a COORD device. One technique described herein for conserving power is to use lower transmit power and relax the range requirements for a transmitter below that which would be acceptable for an 802.11x transmission. This reduces the reception range of the PER's signal, but in most cases, the COORD is close enough to the PER to get the signal and this is not an issue.

If the transmission and receive range of one or more members of a secondary network are reduced to conserve power, frames transmitted by the PER might not be detectable by members of the primary network and communication among members of the primary network might not be detected by the PER. This can lead to interference between both networks, especially if both networks operate in the same frequency band and on the same channel. This can be addressed by using different frequency bands or channels, but can also be dealt with using a common band or set of bands and a common channel or set of channels. One such coordination method comprises a novel WM access procedure where a powerful STA, like the COORD, reserves the WM for a low power node, like the PER. The WM reservation would be heard by devices in a primary network that could not be reached by the PER.

Additional power-save enhancement techniques can be applied inside the PER. As an example, the PER and COORD may agree on inactivity times, and disable at least part of the logic and/or circuitry at the start of an inactivity time, wherein disabling is such that less power per unit time is consumed by the logic and/or circuitry relative to power consumed when not disabled.

In many wireless PAN applications, it is important to minimize the power usage not only inside the PER but also inside the COORD. This is typically the case when the COORD is also a battery-operated device. An example of such wireless PAN is the attachment of a wireless peripheral to a laptop. Another example is the attachment of a headset to a mobile phone or PDA. It is important to minimize the power usage inside the laptop, mobile phone or PDA, since that determines how long such device can be used before a recharge is needed. 802.11x wireless LAN network power saving techniques are typically found only in the STA devices, as most access points are wired for electricity and data. For example, in the BSS shown in FIGS. 1-2, power saving techniques might be implemented inside the STAs but the AP stays awake all the time.

Overlay Protocol with PWN Feature Reuse

Where the PWN is a WLAN typically used for network traffic over a relatively large space, such as a building and the SWN is a PAN is typically used for peripheral traffic over a narrower space, such as a room, a desk, a person's space, etc., the optimum protocols for the two networks are likely to be different such that what works well for one network does not work well for another network. Nevertheless, if a single computing device is to be a part of both networks, it is desirable to re-use specific PWN features and networking hardware for communication in the SWN. Where the first network is an 802.11x network and a computing device includes 802.11x networking equipment, an overlay protocol can be used for the SWN, such that 802.11x equipment can be co-opted for use with the SWN, optimized to deal with some of the differing requirements of the two networks.

The overlay protocol allows a dual-net device that is associated with a PWN to exchange information, possibly on the same channel as the primary network, with PERs that are a member of a SWN, and not a member of the PWN, and that may or may not be within the coverage range of the PWN. Access to specific lower level primitives in the 802.11x stack, like the ability to overwrite a frame's duration field, or the ability to transmit/receive on a separate SWN BSSID may or may not be necessary.

As an example of PWN feature reuse, the SWN overlay protocol may use modulations schemes supported by the PWN protocol, so as to enable re-use of the modulation/demodulation logic in the 802.11x equipment. As another example of PWN feature reuse, the SWN overlay protocol may use 802.11x frame arrangements and modifications thereof, so as to ensure that frames in the SWN can be transmitted and received by the 802.11x hardware.

To meet the needs of the SWN, the overlay protocol might need to deal with lower radiated power levels than might be allowed with 802.11x devices, lower latencies and more strict power conservation constraints.

A power-efficient protocol, relative to 802.11x protocols or other WLAN protocols, might be used between the PER and the COORD to further reduce power consumption. In addition to power consumption reduction by using less transmission power, power can be saved using protocols, frames and the like that require less computational effort at the peripheral, further saving power. Thus, where a particular computation used in communications can be eliminated or moved from the PER to the COORD, it might be done.

Network Information/Parameter Storage

The 802.11x PER service function generates the frames necessary for communication with a PER in a SWN. The 802.11x PER service function supports the frame exchange sequences necessary to establish, maintain and/or terminate a connection with a PER. The 802.11x PER service function stores relevant information about PERs in its SWN. Information can include, but is not limited to, the PER's MAC address, herein referred to as the PER's Source Address ("SA") or PER's encryption related information (e.g. a pre-shared key).

In a specific implementation, for a dual-net device to maintain multiple sessions simultaneously, it stores two media addresses, one for communication with devices in the WLAN and one for communication with devices in the wireless PAN. The media addresses can be network Basic Service Set Identifiers (BSSIDs). The BSSID for the primary network can be the MAC address of the AP of the primary network, and the BSSID for the secondary network can be a MAC address that identifies WPAN traffic. As an example, the BSSID of a secondary network can be the WLAN MAC address of the dual-net device, but it can also be a MAC address that is different from the dual-net device's WLAN MAC address. As another example, the BSSID of the secondary network may be global media address to identify WPAN traffic, that is a single MAC address that uniquely identifies all wireless PAN traffic independent of what COORD the wireless PAN traffic is intended for.

In a different implementation of the protocol however, the BSSID of the PWN is re-used and a separate MAC address for the communication in the SWN is not needed.

More than two networks and corresponding storage of addresses and parameters might be provided for.

Packet Recognition

A dual-net device that is simultaneously maintaining a session with a WLAN and a wireless PAN can use a packet recognition mechanism to distinguish traffic in the PWN (the WLAN) from traffic in the SWN (the wireless PAN).

In a specific implementation where the wireless PAN BSSID is different from the WLAN BSSID, a dual-net device can use the BSSID in the packet to distinguish traffic in the primary network from traffic in the secondary network.

Other identification mechanisms, like an Ethertype, an organizationally unique identifier (OUI), specific reserved bits in an 802.11x packet etc. may also be used to identify wireless PAN traffic.

In yet another implementation, the SWN protocol may be such that the dual-net device knows when a wireless PAN frame can be expected. An example of such protocol is a "polling-based" protocol where a PER only sends a frame to its COORD in response to reception of a frame from its COORD. If the dual-net device knows when to expect a wireless PAN frame, it can prepare a temporary buffer for such frame. In the above example, each time the COORD transmits a frame that is intended for a PER, a temporary buffer for a single reply frame might be provided. This identification method works if a PER does not access the WM autonomously, and responds to a frame for the COORD with a single reply frame. The method can easily be extended, using the teachings herein, to the scenario where a PER responds to a frame from the COORD with multiple reply frames by increasing the size of the temporary buffer.

In yet another embodiment, a modified 802.11x frame format is used for communication in the SWN. For example, HCCA data frames with "from DS" and "toDS" fields both cleared might automatically be recognized by the 802.11x stack as wireless PAN traffic.

Alternatively, if no recognition mechanism is provided by the 802.11x stack, all received frames can be propagated up to the 802.11x peripheral service function, and a recognition mechanism implemented inside the 802.11x peripheral service function selects the frame originating from a PER.

In addition to a recognition mechanism to distinguish WLAN traffic from wireless PAN traffic, an additional recognition method may be needed to distinguish traffic from separate wireless PANs. As an example, two or more COORDs of separate wireless PANs may be sharing a common wireless networking medium. If that is the case, a COORD may be receiving frames from devices that belong to different wireless PANs and should be configured to distinguish frames from its own wireless PAN from those that belong to a different wireless PAN. If a different media address is used for each wireless PAN (for example, each wireless PAN has a unique wireless PAN BSSID), then identification can be done based on such media address.

In a specific implementation, a global unique media address may be used to globally identify all wireless PAN traffic. As an example, a global unique BSSID may be used to identify all wireless PAN traffic. In such implementations, an additional identification mechanism may be required to allow a COORD to identify the wireless PAN traffic for which it is the intended recipient. As an example, the Destination Address ("DA") or Receiver Address "RA") field of the 802.11x packets can be used as such identifier. The DA or RA can, for example, be the WLAN MAC address of the COORD. Other similar approaches can be used instead.

Interface to a 802.11x Stack

Different interfaces might be used to interface the 802.11x PER service function to the 802.11x stack, and the available functions might vary with the class of the PER. Furthermore, one or more of the functions that are part of the 802.11x PER service function in one embodiment may have been included in the drivers, firmware and/or logic of the 802.11x stack of a different embodiment.

In a specific implementation, the 802.11x PER service function may generate 802.11x frames with most or all of the MAC header fields provided. In such implementations, the 802.11x stack mainly acts as a "pass-through" and need only perform the manipulation and processing required to transmit a valid PAN packet. The frame may be passed on to the 802.11x stack and can be supplemented with additional parameters. Such parameters may include, but are not limited to, the requested transmit data rate, the requested transmit channel, the value for specific reserved bits in the Physical Layer Convergence Procedure (PLCP) header, and/or parameters related to the timing and frequency of a frame transmission. Alternatively, such parameters may be passed through the 802.11x stack via a separate interface. As an example, some of these parameters do not need to be defined on a per-frame basis, but might be defined on a per-packet basis or might be fixed for all wireless PAN traffic.

The 802.11x peripheral service function may also decide on which queue to use for a specific frame. For example, the 802.11x peripheral service function may decide to transmit frames via the highest priority queue (AC-VO), typically used for wireless Voice-over-IP (VoIP) frames.

In a different, more specific implementation, an available standard interface might be re-used. In such implementation, more processing may be required from the 802.11x stack. As an example, if the COORD is running a Windows (or other applicable brand) OS, a standard Send/Receive NDIS interface might be used. In such implementations, a PER service function might deliver a regular Ethernet packet to the 802.11x stack, and the 802.11x stack may do the required manipulation and processing required to transmit the packet as a valid wireless PAN packet.

Other PER service function interfaces with the 802.11x stack might be used instead.

BSS Notification

Where the COORD is presently associated with a primary network BSS1 as a STA, prior to communicating with a PER over the secondary network, it may be desirable to notify the AP of the primary network BSS that the STA will be temporarily unavailable. This may be important to avoid the situation where the AP tries to communicate with the dual-net device while that device is occupied with dealing with the PER. The BSS1 traffic may even be on a different frequency channel or operating in a different frequency band. If non-responsive, the AP might drop the STA from association with the AP.

Variations

In some embodiments, the communication between the COORD and one or more PERs of the SWN occurs in the same frequency band and on the same frequency channel as the communication of the PWN.

In another embodiment, the communication between the COORD and one or more PERs of the SWN occurs in the same frequency band as the communication in the PWN, but on a different frequency channel than the communication within the PWN. As an example, channel switching may be desirable if the frequency channel of the PWN is crowded, or the SWN application requires a high Quality of Service (QoS).

In other embodiments, the communication between the COORD and one or more PERs of the SWN occurs in a different frequency band and, therefore also on a different frequency channel, as the communication of the PWN. As an example, frequency band switching is necessary if the primary network is in 802.11a mode, operating in the 5-GHz unlicensed frequency band, whereas the PER only supports communication in the 2.4-GHz unlicensed frequency band, or vice versa.

In yet another embodiment, the dual-net device may be communicating in a different mode with the PWN and the SWN. As an example, the COORD may be communicating in 802.11g mode inside the primary network, while using the 802.11b mode for communication within the SWN, or vice versa. In such embodiment, the communication within the SWN can be on the same or on a different frequency channel as the PWN.

In yet another embodiment, communication in the SWN uses the same mode as the PWN, with both networks using different data rates or where it is not known whether the data rates are different or the same (such as where they are set independently). In one embodiment, the COORD transmits frames at the same data rate as its data rate for communication within the primary network, whereas the PER communicates with the COORD using a different data rate. In that case, different data rates are used for downlink and uplink communication within the SWN. Alternatively, the same data rate is used for downlink and uplink communication within the SWN and this data rate is different from the data rate used by the dual-net device for communication within the PWN. It is also possible that the data rates for PWN and SWN communication are set independently, but at certain moments in time turn out to be the same.

In a common operation, a link is established between a network circuit and a BSS while simultaneously linked with a secondary network device. In one variation, some aspects could also be used to establish a link between a standard 802.11x card and a power-sensitive device, even if the standard 802.11x card is not simultaneously connected to a BSS. For example, in a GSM/WiFi combo phone, the device might be handling a call over the cellular network and the WiFi card could still be used for headset connectivity.

In many of the examples described herein, one feature is the use of a common PHY and MAC layer for two networks, one being a conventional 802.11x network with a BSSID and the other being a secondary network connecting what would otherwise be an 802.11x STA with peripherals and other low-power, short-range devices. In some embodiments, only part of the MAC layer is in common and other variations are possible. In a more general case in another network model, there is common use of a modulation scheme and a frame formatting layer, wherein the PHY and MAC are specific instances.

In many of the examples described herein, the station device is wirelessly coupled to an 802.11x access point while being active with devices over the SWN. In other variations, the station device is wirelessly coupled to another station over a direct link while being active with devices over the SWN. In yet other variations, the station device may be the AP of the PWN, while also being the COORD for the SWN.

In the typical embodiment in an 802.11x environment, an 802.11x STA can talk to an access point and to devices in the SWN without losing synchronization and association and without requiring a reset of a connection at the 802.11x STA. The 802.11x STA can reserve a wireless medium for a weak peripheral, effectively solving a "hidden node" problem for the low-power peripheral or other such device.

In many of the examples herein, where a device is described as a dual-net device it is intended to be a description of a device that can be a coordinator for a SWN while being a station in a PWN. Often the description of operations, features and/or elements of the dual-net devices also apply to secondary wireless PAN COORDs that may not have a capability to become a full node in the primary network.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. A wireless network interface circuit, adapted to be coupled to a computing device for conveying data to and from the computing device wirelessly over a common wireless medium shared by a wireless local area network (WLAN) and a wireless personal area network (PAN), the circuit comprising: a processor; a wireless interface; and storage configured to store:

logic for communicating, wirelessly over a specified frequency range with an access point of a first wireless network being an IEEE 802.1 lx network;

logic for communicating with a node of a second wireless network as a network controller, wherein the second wireless network operates using protocols that are only partially compliant with frame formatting layer protocols of the first wireless network but wherein at least some portion of an overlay protocol is partially compliant with the frame formatting layer protocol used on the WLAN such that a WLAN device can process at least a part of a packet sent using the overlay protocol, and wherein the overlay protocol comprises a protocol having WLAN frame formats, or modifications thereof, such that WLAN devices can, upon receiving an overlay protocol frame, understand at least enough of the overlay protocol frame to defer use of the common wireless networking medium;

logic for a convergence layer between an IEEE 802.1 lx stack and different drivers to enable multi-protocol support, expose and coordinate access to specific Media Access Control (MAC) service primitives and coordinate priority handling in Quality-of-Service (QoS) sensitive applications; and logic for:

determining end of an inactivity time agreed to by a wireless PAN device sharing the common wireless medium with the computing device, where the wireless network interface circuit is configured to coordinate traffic between the WLAN and the wireless PAN using an overlay PAN protocol that is at least partially compatible with WLAN protocol;

enabling a coordination function following the end of the inactivity time; transmitting, using the coordination function, frames detectable by an access point of the WLAN, the frames modified for PAN traffic and configured to signal a request for the WLAN to defer access by one or more WLAN devices to the common wireless medium for a reservation period; and during the reservation period and after the end of the inactivity time, communicating, by way of the wireless interface, with the wireless PAN device over the common wireless medium.

2. The wireless network interface circuit of claim 1, wherein the logic is implemented by a software driver and the storage manipulated, at least in part, by the software driver.

3. The wireless network interface circuit of claim 1, wherein the storage is configured to store logic for:

storing a first Media Access Control (MAC) address for the network circuit, wherein the first MAC address identifies the network circuit to the WLAN; and storing a second MAC address for the network circuit, wherein the second MAC address identifies the network circuit to the wireless PAN.

4. The wireless network interface circuit of claim 3, wherein the storage is configured to store logic for:

transmitting, using the coordination function, frames of data over the wireless PAN using the second MAC address while the computing device maintains an association with the WLAN with the first MAC address.

5. The wireless network interface circuit of claim 1, wherein the WLAN is characterized by a plurality of nodes intercommunicating over a network of independent WLAN devices.

6. A method performed by a wireless network interface circuit comprising a processor and a wireless interface, the wireless network interface being adapted to be coupled to a computing device for conveying data to and from the computing device wirelessly over a common wireless medium shared by a wireless local area network (WLAN) and a wireless personal area network (PAN), the method comprising:
communicating, wirelessly over a specified frequency range with an access point of a first wireless network being an IEEE 802.1 lx network;
   communicating with a node of a second wireless network as a network controller, wherein the second wireless network operates using protocols that are only partially compliant with frame formatting layer protocols of the first wireless network but wherein at least some portion of an overlay protocol is partially compliant with the frame formatting layer protocol used on the WLAN such that a WLAN device can process at least a part of a packet sent using the overlay protocol, and wherein the overlay protocol comprises a protocol having WLAN frame formats, or modifications thereof, such that WLAN devices can, upon receiving an overlay protocol frame, understand at least enough of the overlay protocol frame to defer use of the common wireless networking medium;
acting as a convergence layer between an IEEE 802.1 lx stack and different drivers to enable multi-protocol support, expose and coordinate access to specific Media Access Control (MAC) service primitives and coordinate priority handling in Quality-of-Service (QoS) sensitive applications;
determining end of an inactivity time agreed to by a wireless PAN device sharing the common wireless medium with the computing device, where the wireless network interface circuit is configured to coordinate traffic between the WLAN and the wireless PAN using an overlay PAN protocol that is at least partially compatible with WLAN protocol;
enabling a coordination function following the end of the inactivity time; transmitting, using the coordination function, frames detectable by an access point of the WLAN, the frames modified for PAN traffic and configured to signal a request for the WLAN to defer access by one or more WLAN devices to the common wireless medium for a reservation period; and
during the reservation period and after the end of the inactivity time, communicating, by way of the wireless interface, with the wireless PAN device over the common wireless medium.

7. The method of claim 6, wherein communicating, wirelessly over the specified frequency range with the access point of the first wireless network, comprises communicating using a software driver.

8. The method of claim 6, comprising:
storing a first Media Access Control (MAC) address for the network circuit, wherein the first MAC address identifies the network circuit to the WLAN; and
storing a second MAC address for the network circuit, wherein the second MAC address identifies the network circuit to the wireless PAN.

9. The method of claim 6, comprising:
transmitting, using the coordination function, frames of data over the wireless PAN using the second MAC address while the computing device maintains an association with the WLAN with the first MAC address.

10. The method of claim 6, wherein the WLAN is characterized by a plurality of nodes intercommunicating over a network of independent WLAN devices.

* * * * *

UNITED STATES PATENT AND TRADEMARK OFFICE
CERTIFICATE OF CORRECTION

PATENT NO. : 9,036,613 B2  
APPLICATION NO. : 11/376753  
DATED : May 19, 2015  
INVENTOR(S) : Katelijn Vleugels and Roel Peeters Page 1 of 1

It is certified that error appears in the above-identified patent and that said Letters Patent is hereby corrected as shown below:

Claims

Column 20, Line 15; In Claim 1, delete "802.1 lx" and insert -- 802.11x --, therefor.
Column 20, Line 31; In Claim 1, delete "802.1 lx" and insert -- 802.11x --, therefor.
Column 21, Line 18; In Claim 6, delete "802.1 lx" and insert -- 802.11x --, therefor.
Column 21, Line 34; In Claim 6, delete "802.1 lx" and insert -- 802.11x --, therefor.

Signed and Sealed this
Twenty-third Day of February, 2016

Michelle K. Lee
*Director of the United States Patent and Trademark Office*